(12) United States Patent
Byun et al.

(10) Patent No.: US 11,443,104 B2
(45) Date of Patent: *Sep. 13, 2022

(54) GRAPHICAL USER INTERFACE FOR INTER-PARTY COMMUNICATION WITH AUTOMATIC SCORING

(71) Applicant: ServiceNow, Inc., Santa Clara, CA (US)

(72) Inventors: Harold Byun, Redwood City, CA (US); Richard Reybok, Fremont, CA (US); David Barkovic, San Francisco, CA (US); Vivian Gopico Tero, San Francisco, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,217

(22) Filed: Jul. 6, 2020

(65) Prior Publication Data
US 2020/0334413 A1    Oct. 22, 2020

Related U.S. Application Data

(63) Continuation of application No. 15/588,161, filed on May 5, 2017, now Pat. No. 10,706,226.

(51) Int. Cl.
| | |
|---|---|
| *G06F 40/174* | (2020.01) |
| *H04L 67/02* | (2022.01) |
| *G06F 9/451* | (2018.01) |
| *G06F 9/445* | (2018.01) |

(52) U.S. Cl.
CPC ............ *G06F 40/174* (2020.01); *G06F 9/451* (2018.02); *H04L 67/02* (2013.01); *G06F 9/44505* (2013.01)

(58) Field of Classification Search
None
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,678,887 B1 | 1/2004 | Hallman |
| 6,816,898 B1 | 11/2004 | Scarpelli |
| 7,020,706 B2 | 3/2006 | Cates |

(Continued)

*Primary Examiner* — Frank D Mills
(74) *Attorney, Agent, or Firm* — Fletcher Yoder PC

(57) ABSTRACT

An embodiment may involve transmitting, to a first client device, a representation of a first graphical user interface. The first graphical user interface may define fillable web-based forms. The embodiment may involve receiving, from the first client device, a first submission of the fillable web-based forms. The embodiment may involve transmitting, to a second client device, a representation of a second graphical user interface. The second graphical user interface may allow the second client device to fill out the fillable web-based forms. The embodiment may further involve receiving, from the second client device, a second submission of the fillable web-based forms. The embodiment may further involve determining numerical scores associated with each of the fillable web-based forms. The embodiment may also involve transmitting a representation of a third graphical user interface. The third graphical user interface may show the fillable web-based forms and their respective numerical scores.

20 Claims, 12 Drawing Sheets

(56) References Cited

U.S. PATENT DOCUMENTS

| | | |
|---|---|---|
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,226,096 B2 | 9/2012 | Navarrete |
| 8,478,569 B2 | 6/2013 | Dang |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 8,983,982 B2 | 3/2015 | Rangarajan |
| 9,065,783 B2 | 6/2015 | Ding |
| 9,122,552 B2 | 9/2015 | Whitney |
| 9,239,857 B2 | 1/2016 | Trinon |
| 9,508,051 B2 | 11/2016 | Falk |
| 9,535,737 B2 | 1/2017 | Joy |
| 9,557,969 B2 | 1/2017 | Sharma |
| 9,792,387 B2 | 10/2017 | George |
| 9,819,729 B2 | 11/2017 | Moon |
| 2003/0088493 A1* | 5/2003 | Larsen .................. G06Q 10/10 705/36 R |
| 2003/0126049 A1 | 7/2003 | Nagan et al. |
| 2005/0256727 A1 | 11/2005 | Bennett et al. |
| 2010/0198631 A1 | 8/2010 | Edwards et al. |
| 2013/0132440 A1 | 5/2013 | Carlson et al. |
| 2013/0275176 A1* | 10/2013 | Brown ............... G06Q 10/0635 705/7.28 |
| 2013/0311224 A1* | 11/2013 | Heroux .................. G06Q 90/00 705/7.15 |
| 2014/0157380 A1 | 6/2014 | Abrams et al. |
| 2014/0278730 A1* | 9/2014 | Muhart ............. G06Q 10/0635 705/7.28 |
| 2017/0053329 A1* | 2/2017 | Bowers ............. G06Q 30/0609 |
| 2018/0174243 A1* | 6/2018 | Mishra .................. G06F 40/174 |

* cited by examiner

Service Management 700

Filter Navigator 714

701

∨ Assessments 702
  My Assessments 702a
  All Assessments 702b
∨ Issues 704
  Create New 704a
  My Open Issues 704b
  All Open Issues 704c
  All Issues 704d
∨ Administration 706
  Assessment Templates 706a
  Questionnaire Templates 706b
  Document Request Templates 706c
  Business Service Weights 706d
  Choices 706e
  Score Mapping 706f Companies    708 Go to [Name ∨] [Search]    « < [ 1 of 20 ] > »

710    712

| | Name | Street | City | State | Country | Vendor type | Risk Tier |
|---|---|---|---|---|---|---|---|
| 710a | Company 1 | 555 W. Candy Ln. | San Jose | CA | U.S. | Hardware | 10 |
| 710b | Company 2 | 2 Chome-7-1 Otacho | Mizuho-ku | Nagoya | Japan | Software | 10 |
| 710c | Company 3 | 691 N. Rooster Way | Birmingham | AL | U.S. | Services | 8 |
| 710d | Company 4 | 1212 E. Needle St. | Seattle | WA | U.S. | Software | 10 |
| 710e | Company 5 | 193 S. Financial Pl. | New York | NY | U.S. | Hardware, Services | 9 |
| 710f | Company 6 | 24 Granit St. | Park Afek | Rosh Ha'ayin | Israel | Software, Applications | 7 |
| 710g | Company 7 | 891 Biscuit Ave. | Dallas | TX | U.S. | Software | 10 |
| 710h | Company 8 | 322 Queen St. | Brisbane | Queensland | Australia | Hardware | 8 |
| 710i | Company 9 | 243 Jayhawk Ln. | Moundridge | KS | U.S. | Software | 8 |
| 710j | Company 10 | 415 W. River Rd. | Cupertino | CA | U.S. | Applications | 10 |

FIG. 7A

Service Management  700

⌄ Filter Navigator  714

⌄Assessments  702
  My Assessments
  All Assessments
⌄Issues  704
  Create New
  My Open Issues
  All Open Issues
  All Issues
⌄Administration  706
  Assessment Templates  706a
  Questionnaire Templates  706b
  Document Request Templates  706c
  Business Service Weights  706d
  Choices  706e
  Score Mapping  706f Assessment Metric Types Go to [Name ⌄] [Search]  708                                    « <  [1 of 20]  > »
                                                                         712

| 716 Name | Description |
|---|---|
| 716a Business | General business practices questionnaire. |
| 716b Cloud Security | General cloud security questionnaire. |
| 716c Privacy | Data privacy questionnaire. |
| 716d Sample | Demonstrates all question types. |
| 716e SIG Full | Shared Assessments Standard Information Gathering Lite |
| 716f SIG Lite | Shared Assessments Standard Information Gathering Lite |

Service Management 700

Filter Navigator

- ∨ Assessments 702
  - My Assessments
  - All Assessments
- ∨ Issues 704
  - Create New
  - My Open Issues
  - All Open Issues
  - All Issues
- ∨ Administration 706
  - Assessment Templates
  - Questionnaire Templates
  - Document Request Templates
  - Business Service Weights

Vendor Risk Assessment

« < [ 1 of 20 ] > »

720 Draft ✓ ⟩ Submitted to Vendor ✓ ⟩ Responses Received ✓ ⟩ Generating Observations ⟩ Finalizing with Vendor ⟩ Closed  712

718

- 720a Number: (VAR1998)
- 720b Vendor: (Candy Canes, Inc.)
- 720c Assessment template: (Security Assessment – High Risk – Cloud)
- 720d Assigned to: (John Doe)
- 720e Name: (Security Assessment - 2017)
- 720f Description: (Assessment for information security policies and procedures)

- 720g State: (Generating Observations)
- 720h Risk rating: (High)
- 720i Created: (2017-02-02)
- 720j Updated: (2017-02-18)

| Questionnaires | Document Requests | Issues | Tasks | 722 |

| | Name | Description | Risk score | Risk Rating |
|---|---|---|---|---|
| 722a | | | | |
| 722b | ✓ Business | General business practices... | 17 | Critical |
| 722c | ✓ SIG Lite | Shared Assessments Standard... | 76 | Low |
| 722d | ☐ Privacy | Data privacy questionnaire | 81 | Low |

| Company 726 | | 730 John Doe |
|---|---|---|
| 728 Home > Assessments > Security Assessment - 2017 | | |

Security Assessment - 2017

732

| Requests ⑤ | Issues ① | Tasks ⓪ 734 |
|---|---|---|
| 734a Number | Short Description | Priority | State | Assigned to |
| 734b VAI1008 | Insufficient audit retention period | 3 - Moderate | Unresolved | John Doe |

FIG. 7D

GRAPHICAL USER INTERFACE FOR INTER-PARTY COMMUNICATION WITH AUTOMATIC SCORING

CROSS-REFERENCE TO RELATED APPLICATIONS

This application is a continuation of U.S. patent application Ser. No. 15/588,161, filed May 5, 2017, which is hereby incorporated by reference in its entirety.

BACKGROUND

An enterprise, when completing tasks and projects, may utilize various vendors, as the enterprise would otherwise use copious resources to complete all of the enterprise's tasks itself. When enterprises use vendors in this manner, the relationship could result in scenarios where the vendors' policies may not comply with the enterprise's policies. These scenarios may be undesirable for the enterprise because non-compliant vendor policies may expose the enterprise to liability.

Traditionally, these enterprises may send communications to vendors by mail or electronic mail (email) requesting information related to the vendors' policies. Because the communications are confined to email, for instance, it may be difficult to keep track of the compliance status of multiple vendors. In particular, it is unclear how this compliance can be scored when compliance data is spread across multiple communications.

SUMMARY

As previously discussed, enterprises may have difficulties evaluating communications to and from potential and current vendors via traditional communication methods (i.e., postal mail and email). Thus, it may be desirable for an enterprise to use a computing system to communicate with vendors. The computing system may provide one or more graphical user interfaces to allow the enterprise to customize communications between it and a vendor. Such graphical user interfaces may increase transparency between the enterprise and the vendors it chooses for its tasks and projects. This may allow the enterprise and vendor to engage in direct conversation via one or more graphical user interfaces.

The graphical user interfaces may have capabilities to allow an enterprise to send communications to vendors as fillable web-based forms. The vendors may fill out the forms by way of the graphical user interface. Each fillable web-based form may have a series of predefined weights set by the enterprise. The enterprise may set the weights via the graphical user interface, and the weights may be based on the importance of particular compliance information, as represented by the forms. Based on the forms submitted by the vendors, the enterprise may follow up with questions or request that the vendor resubmit forms. Traditionally, the enterprise may have had to send multiple emails in order to follow up with a vendor, but the embodiments herein may allow the enterprise to comment on a vendor's submission or even exchange messages directly with the vendor in real-time or near-real time.

After a vendor submits responses to the fillable web-based forms, the computing system may determine a score based on the responses to the fillable web-based forms and the predefined weights set by the enterprise.

In an example, an enterprise may own a professional baseball team and may have an upcoming baseball game. In this example, the enterprise may hire dozens of vendors to help host the baseball game. The enterprise may hire food, security, and parking vendors for the game. The enterprise may send forms to the various vendors via a graphical user interface. These forms may relate to vendor policies, including, but not limited to, food handling policies, employment policies, and payment policies. In the graphical user interface, the enterprise may set predefined weights for certain forms based on the priority level. In this example, the enterprise may have a high priority for forms that relate to vendor policies on handling food and a low priority for forms that relate to vendor policies for payment. This difference in priority may be directly related to the exposure to liability that could result from the vendor policies if they are non-compliant with the enterprise's policies or local regulations.

After sending the forms to the vendor, the vendor may fill out the forms and send the forms back to the enterprise. The enterprise may then evaluate the filled-out forms to determine whether there are any gaps between the vendor's policies and the enterprise's policy. A gap between the vendor policy and the enterprise policy may expose the enterprise to liability. After receiving the form containing the non-compliant food inspection policy, the enterprise may follow up with the vendor to remedy the discrepancy.

Traditionally, the enterprise may receive the form from the vendor, determine that the policy is non-compliant with the internal policies of the enterprise or local regulations, and then email the vendor further questions regarding their policy. In the embodiments described herein, the enterprise may instead "comment" on the submitted information or send a message to the vendor via a graphical user interface. Once the enterprise has corresponded with the vendor, the vendor may have a predefined period in which to respond.

The vendor may update information or policies after submitting the initial forms via the graphical user interface. When this occurs, the computing system may automatically update the score based on the new information. Traditionally, the enterprise may have not have had a solution to automatically update a vendor's score. However, the computing system may dynamically assess the score of the vendor by calculating a new score based on the new submission of forms and the predefined weights set by the enterprise.

Accordingly, a first example embodiment may involve a computing system with one or more processors, a memory, and program instructions, stored in the memory, that upon execution by the one or more processors cause the computing system to perform operations. The operations may include transmitting, to a first client device, a representation of a first graphical user interface. The first graphical user interface may be configurable by the first client device to define one or more custom or standardized fillable web-based forms. The computing system may be disposed within a remote network management platform that manages a managed network. The first client device may be disposed within the managed network. At least some of the fillable web-based forms may include content related to operation of the managed network.

The operations may also include receiving, from the first client device, a first submission of the fillable web-based forms. The operations may include transmitting, to a second client device, a representation of a second graphical user interface. The second graphical user interface may be configurable by the second client device to fill out the fillable web-based forms by data entry into the second graphical user interface or by file upload. The second client device may be disposed in a network that is neither the managed network nor the remote network management platform.

The operations may further include receiving, from the second client device, a second submission of the fillable web-based forms. The fillable web-based forms may be at least partially filled out in the second submission. The operations may further include determining numerical scores associated with each of the fillable web-based forms. The numerical scores may be calculated based on the fillable web-based forms as at least partially filled out and predefined weights assigned to the fillable web-based forms.

The operations may also include transmitting, to the first client device, a representation of a third graphical user interface. The third graphical user interface may be configurable by the first client device to view the fillable web-based forms as at least partially filled out and their respective numerical scores.

In a second example embodiment, a computing system may perform steps in accordance with the first example embodiment.

In a third example embodiment, an article of manufacture may include a non-transitory computer-readable medium, having stored thereon program instructions that, upon execution by a computing system, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7A depicts a representation of a graphical user interface, in accordance with example embodiments.

FIG. 7B depicts a representation of a graphical user interface, in accordance with example embodiments.

FIG. 7C depicts a representation of a graphical user interface, in accordance with example embodiments.

FIG. 7D depicts a representation of a graphical user interface, in accordance with example embodiments.

DETAILED DESCRIPTION

Figure 1:
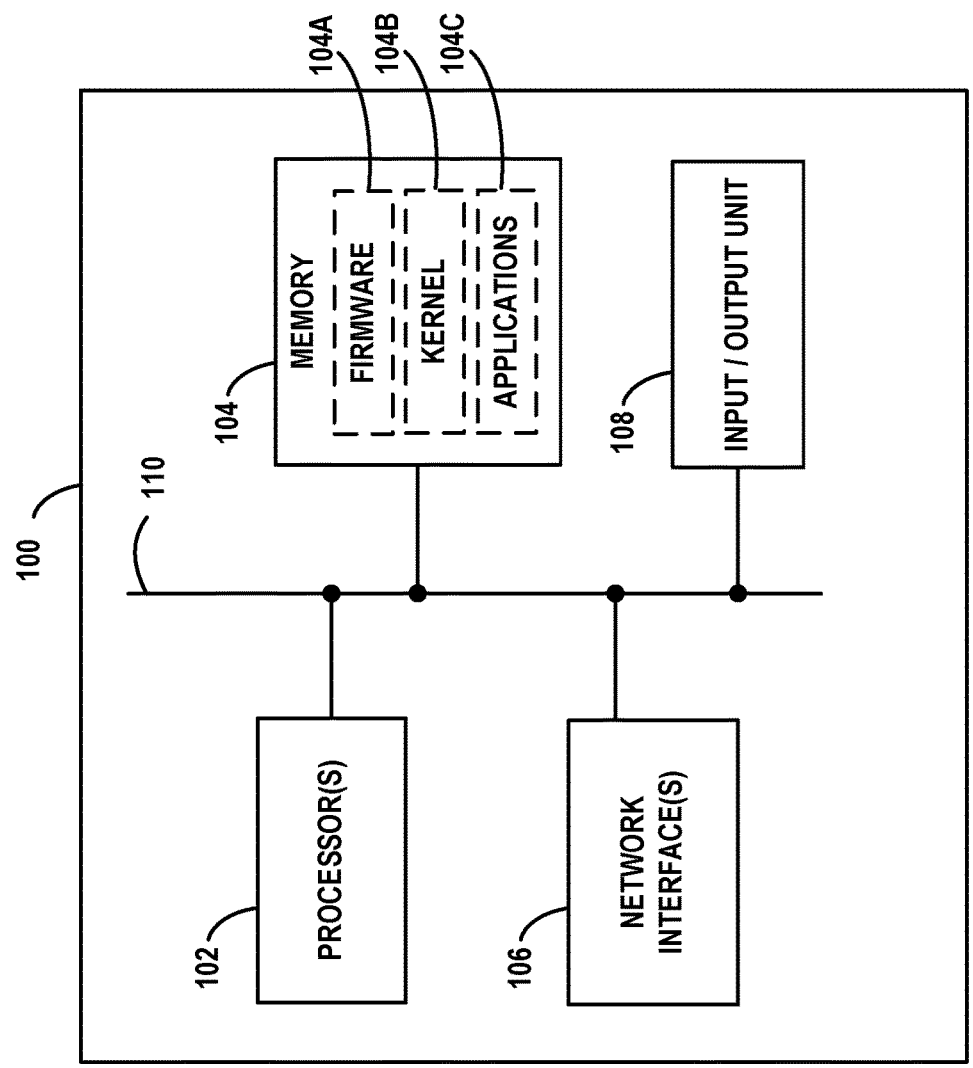
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships there between. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations.

In this example, computing device 100 includes processor(s) 102 (referred to as "processor 102" for sake of simplicity), memory 104, network interface(s) 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be a single-core processor, and in other cases, processor 102 may be a multi-core processor with multiple independent processing units. Processor 102 may also include register memory for temporarily storing instructions being executed and related data, as well as cache memory for temporarily storing recently-used instructions and data.

Memory 104 may be any form of computer-usable memory, including but not limited to register memory and cache memory (which may be incorporated into processor 102), as well as random access memory (RAM), read-only memory (ROM), and non-volatile memory (e.g., flash memory, hard disk drives, solid state drives, compact discs (CDs), digital video discs (DVDs), and/or tape storage). Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs.

Network interface(s) 106 may take the form of a wireline interface, such as Ethernet (e.g., Fast Ethernet, Gigabit Ethernet, and so on). Network interface(s) 106 may also support communication over non-Ethernet media, such as coaxial cables or power lines, or over wide-area media, such as Synchronous Optical Networking (SONET) or digital subscriber line (DSL) technologies. Network interface(s) 106 may also take the form of a wireless interface, such as IEEE 802.11 (Wifi), BLUETOOTH®, global positioning system (GPS), or a wide-area wireless interface. However, other forms of physical layer interfaces and other types of standard or proprietary communication protocols may be used over network interface(s) 106. Furthermore, network interface(s) 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
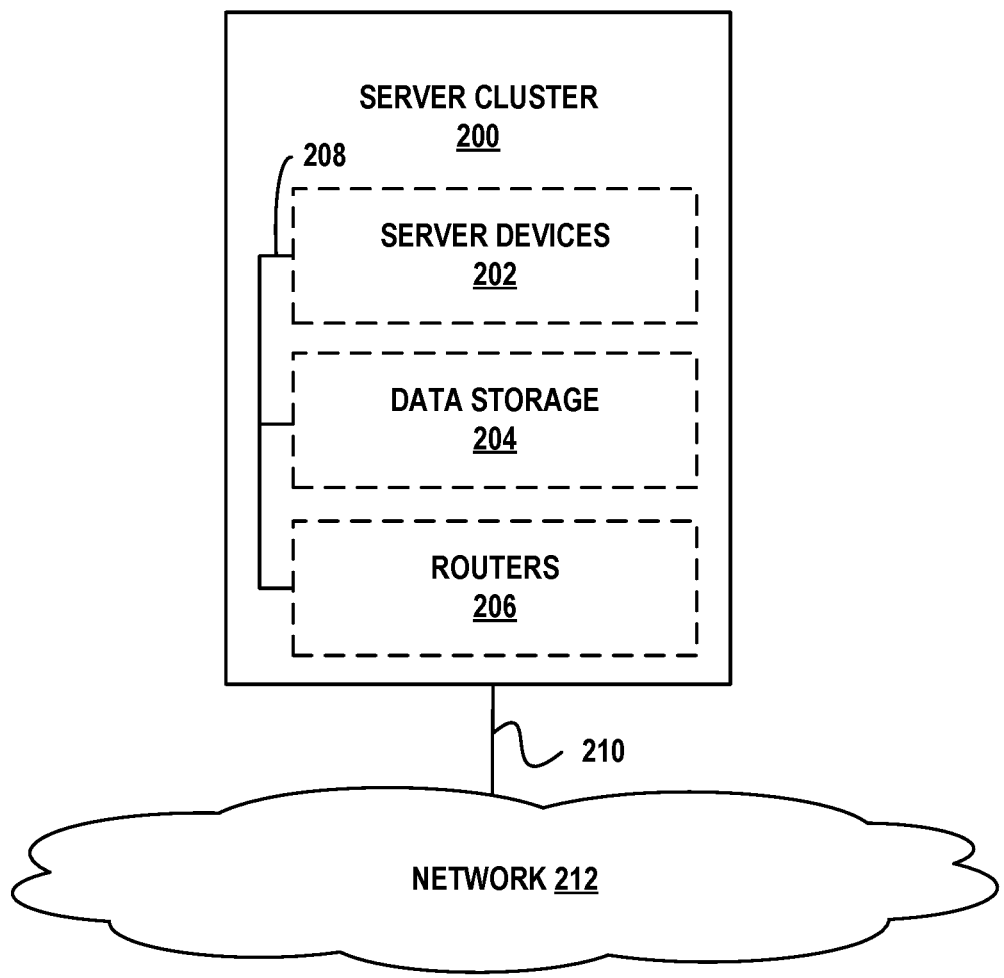
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
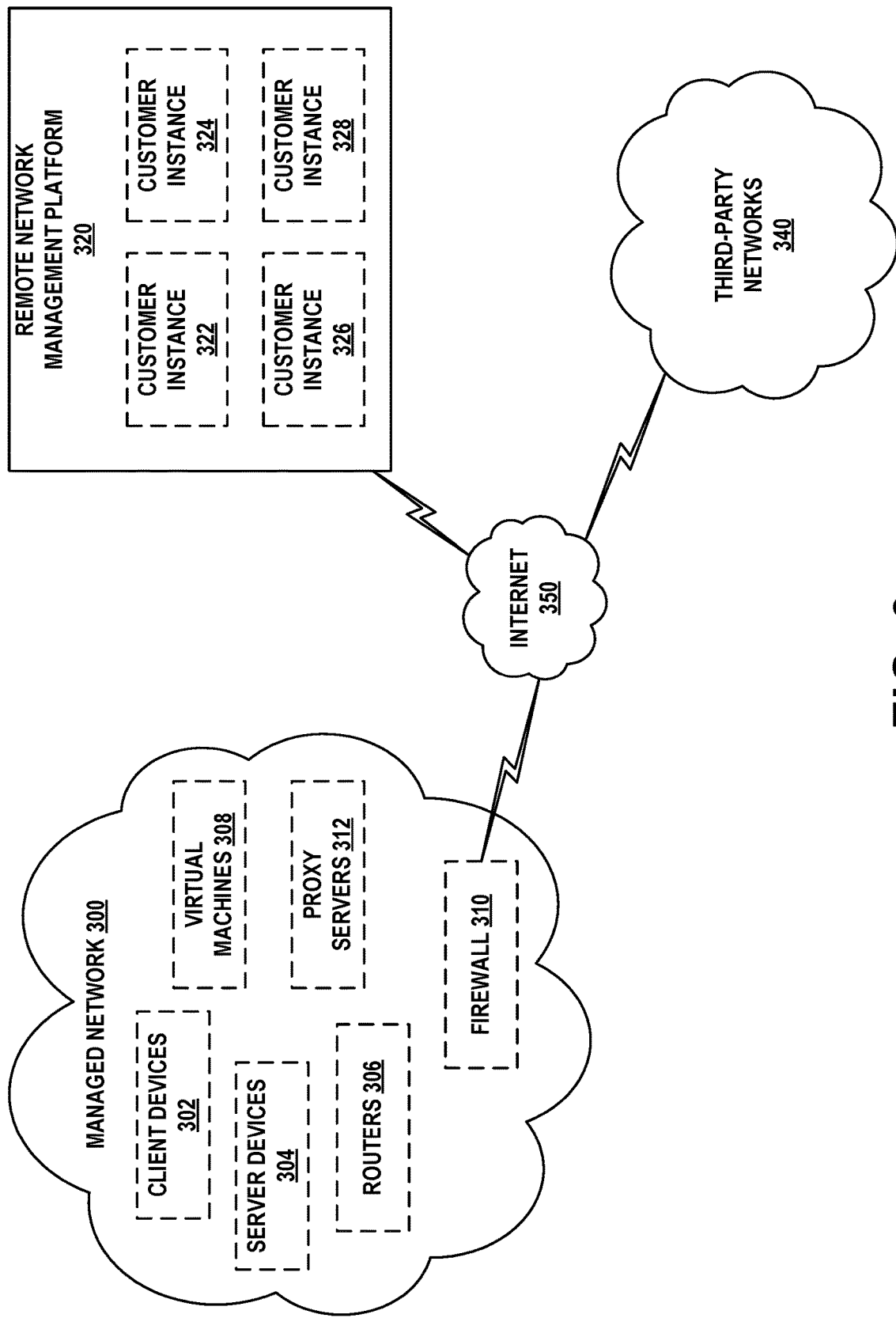
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices and services therein, while allowing authorized communication that is initiated from managed network 300. Firewall 310 may also provide intrusion detection, web filtering, virus scanning, application-layer gateways, and other services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database In contrast, the multi-instance architecture provides each customer with its own database in a dedicated computing instance. This prevents comingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
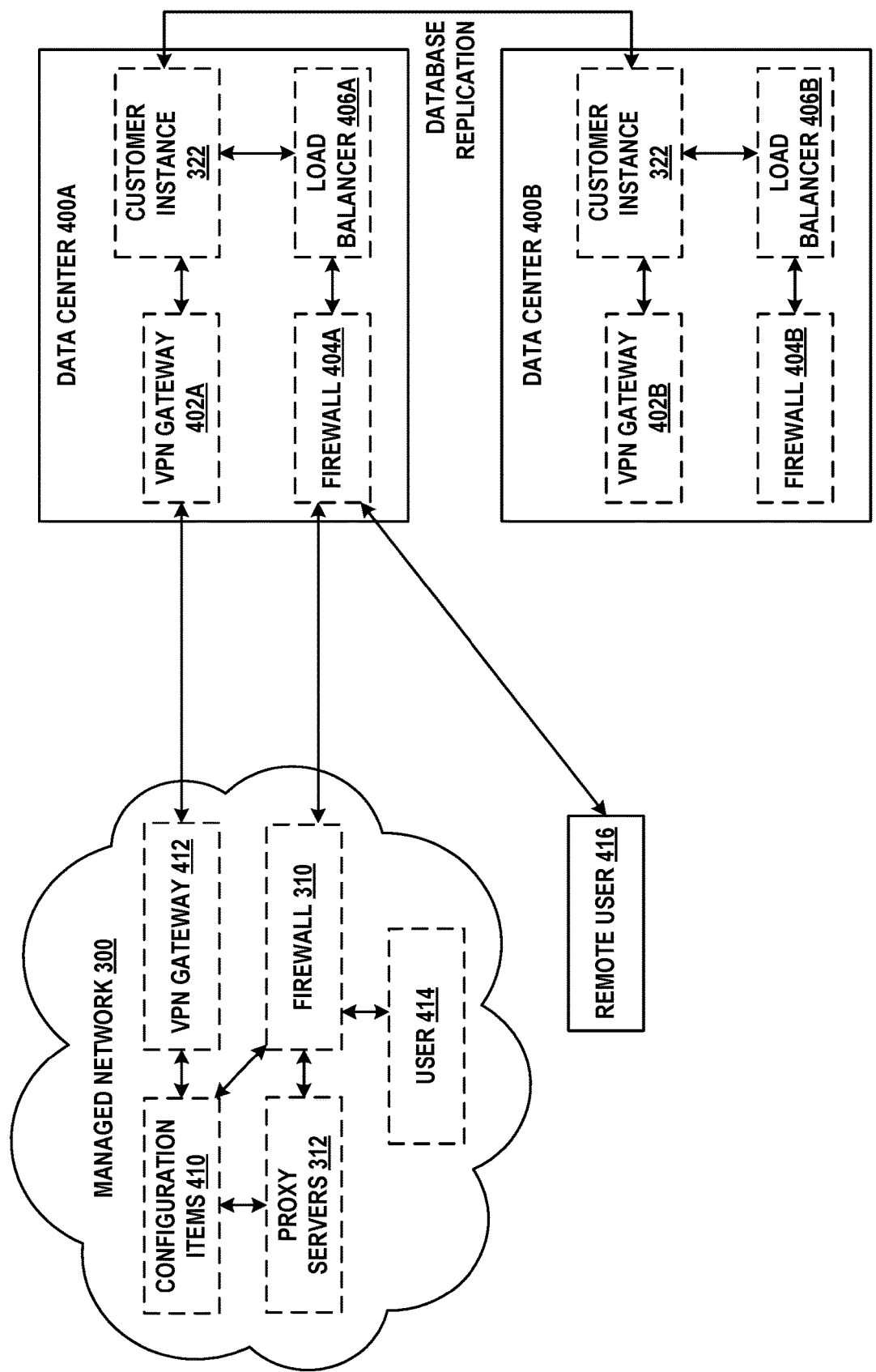
FIG. 4 depicts a communication environment involving a remote network management architecture, in accordance with example embodiments.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications, programs, or services executing thereon, as well as relationships between devices and services. Thus, the term "configuration items" may be shorthand for any physical or virtual device or service remotely discoverable or managed by customer instance 322, or relationships between discovered devices and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device and Service Discovery

In order for remote network management platform 320 to administer the devices and services of managed network 300, remote network management platform 320 may first determine what devices are present in managed network 300, the configurations and operational statuses of these devices, and the services provided by the devices, and well as the relationships between discovered devices and services. As noted above, each device, service, and relationship may be referred to as a configuration item. The process of defining configuration items within managed network 300 is referred to as discovery, and may be facilitated at least in part by proxy servers 312.

For purpose of the embodiments herein, a "service" may refer to a process, thread, application, program, server, or any other software that executes on a device. A "service" may also refer to a high-level capability provided by multiple processes, threads, applications, programs, and/or servers on one or more devices working in conjunction with one another. For example, a high-level web service may involve multiple web application server threads executing on one device and accessing information from a database service that executes on another device. The distinction between different types or levels of services may depend upon the context in which they are presented.

Figure 5A:
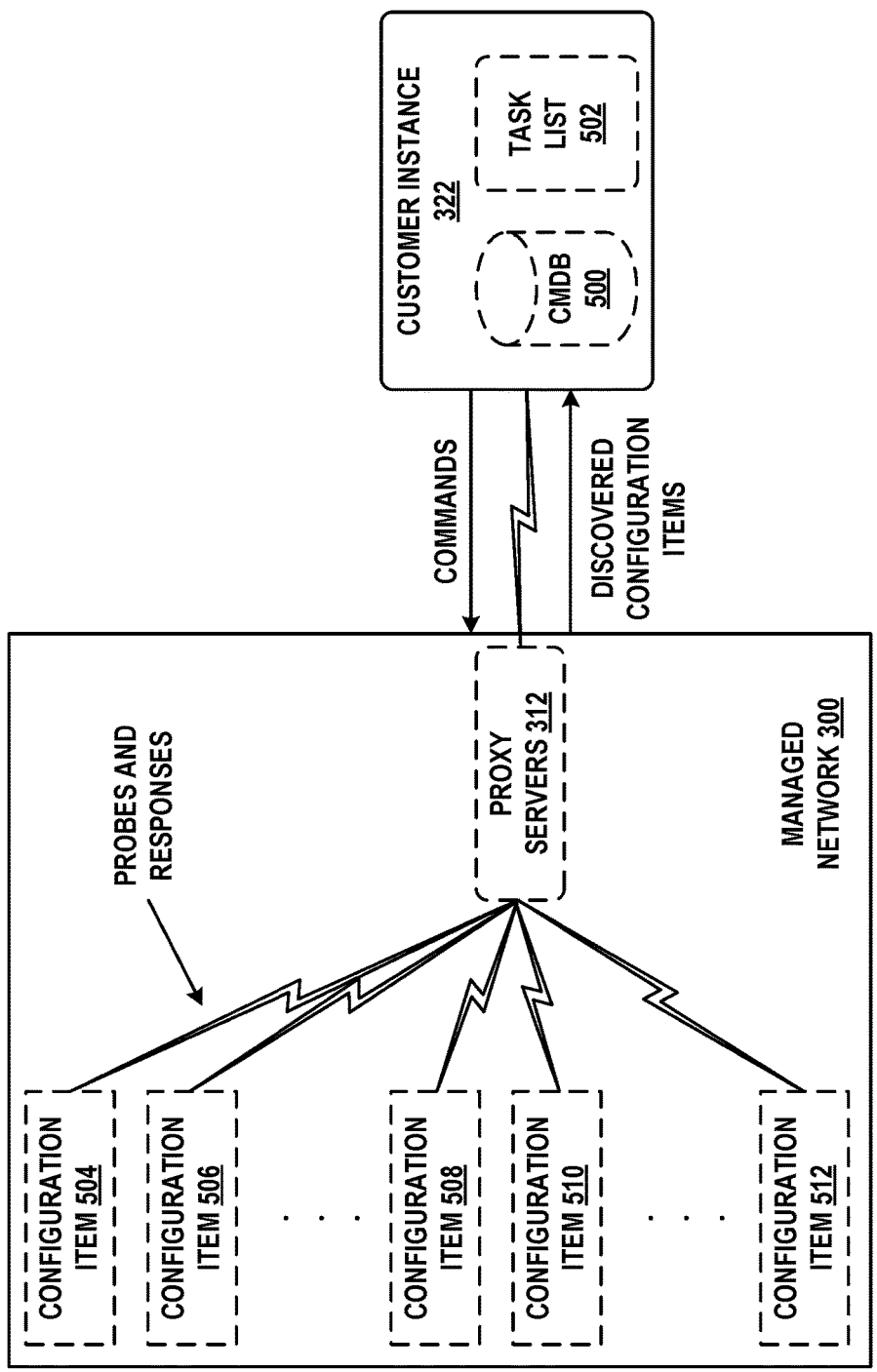
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices and services in managed network 300. These devices and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices and services in managed network 300 as configuration items 504, 506, 508, 510, and 512. As noted above, these configuration items represent a set of physical and/or virtual devices (e.g., client devices, server devices, routers, or virtual machines), services executing thereon (e.g., web servers, email servers, databases, or storage arrays), relationships therebetween, as well as higher-level services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, as a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (services), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device and service is available in CMDB 500. For example, after discovery, operating system version, hardware configuration and network configuration details for client devices, server devices, and routers in managed network 300, as well as services executing thereon, may be stored. This collected information may be presented to a user in various ways to allow the user to view the hardware composition and operational status of devices, as well as the characteristics of services.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
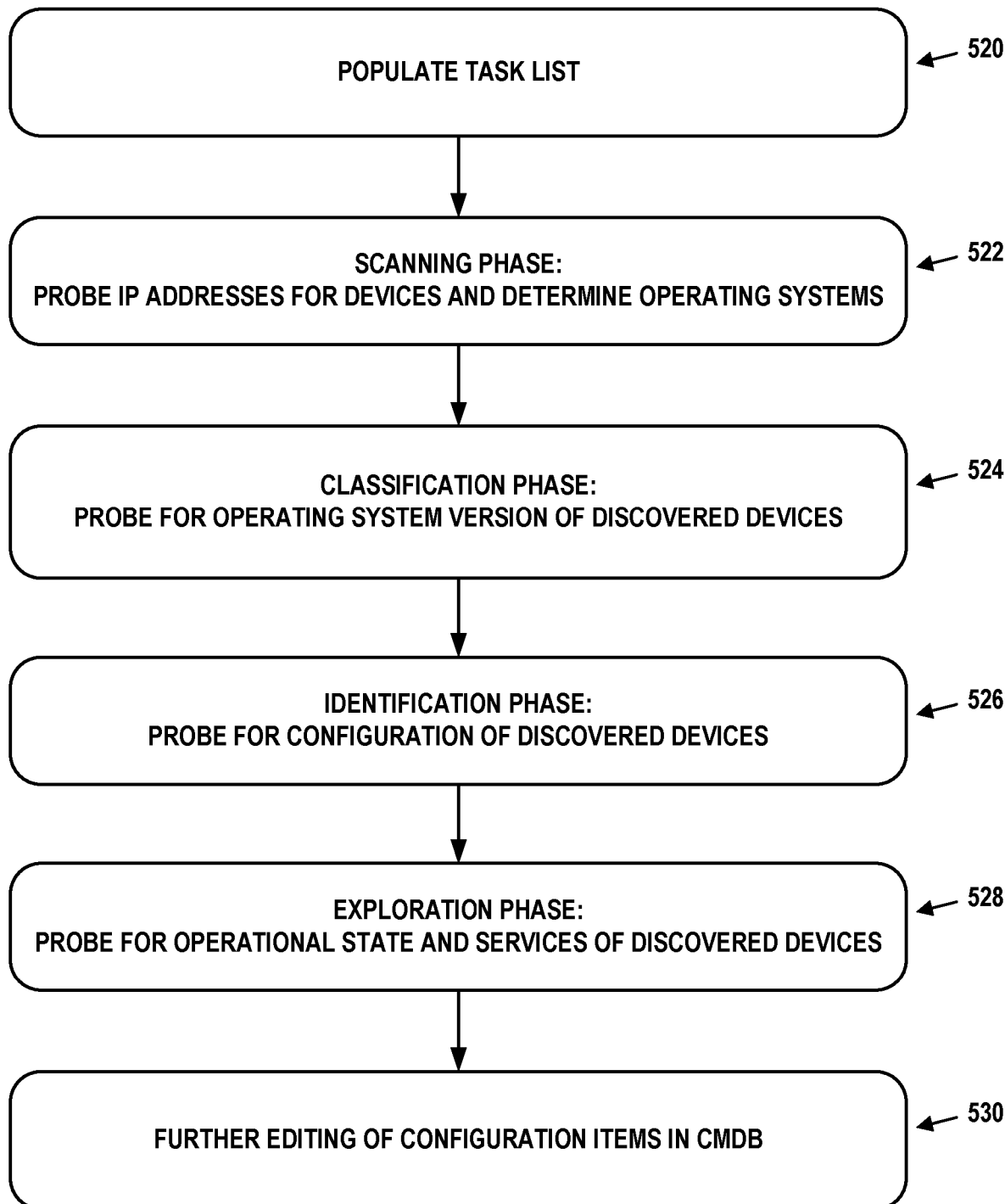
FIG. 5B is a flow chart, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and services executing on the discovered devices. At block 530, further editing of the configuration items representing the discovered devices and services may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Cloud-Based Communication Portal

Enterprises may undertake complicated projects, which may involve the use of vendors to carry out a wide variety of tasks that are too low-level for the managed network to hire its own employees to complete. Vendors may include contractors or other entities working outside of the enterprise's direct control. One problem associated with hiring vendors to complete tasks is the associated risk. This risk may come in the form of non-compliant policies that may expose the enterprise to liability or policies that may result in the managed network not receiving the necessary quality of services. Other types of risk exist.

To assess the risk of hiring a vendor, an enterprise may send forms to a potential vendor. The vendor may complete those forms, and then the enterprise may assess the vendor's responses. If there is a problem with one of the vendor's responses, the enterprise may send follow up emails to the vendor, asking them to change their policy or explain some of their responses. This process can be cumbersome and time consuming. Thus, it may be advantageous or desirable for an enterprise to streamline the assessment process through a graphical user interface.

A. Customer Instance

Figure 6:
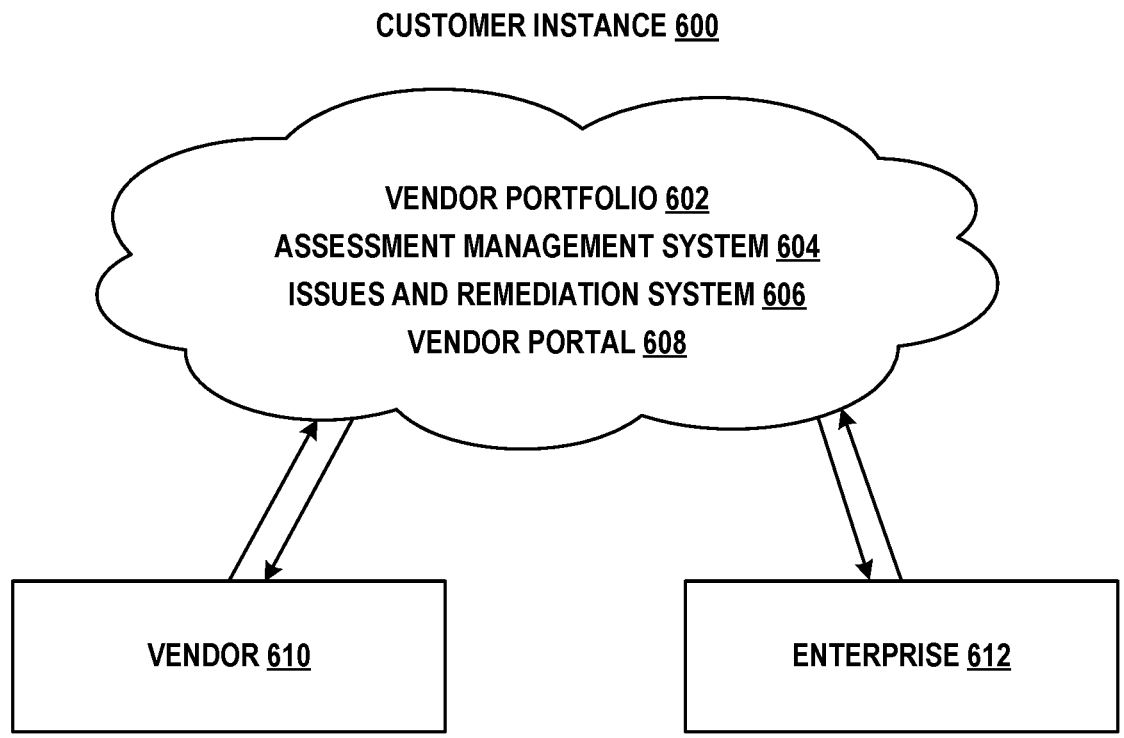
FIG. 6 depicts a customer instance involving a managed network and a third-party, in accordance with example embodiments.

FIG. 6 depicts a customer instance 600. Customer instance 600 may facilitate communication between a vendor 610 and an enterprise 612. Customer instance 600 may be operated on behalf of a managed network 300. Managed network 300 may be operated by enterprise 612. Vendor 610 may include a computing device disposed on a remote network other than managed network 300.

Customer instance 600 may include vendor portfolio 602, assessment management system 604, issues and remediation system 606, and vendor portal 608. Customer instance 600 may be implemented in the same or similar manner as customer instances 322, 324, 326, and 328 in FIGS. 3 and 4.

Customer instance 600 may be represented by a graphical user interface. Among other capabilities, the graphical user interface may score communications between vendor 610 and enterprise 612. Enterprise 612 may access customer instance 600 through a first client device. Vendor 610 may access the customer instance 600 through a second client device. Users associated with enterprise 612 may be able to view and customize vendor portfolio 602, assessment management system 604, and issues and remediation system 606. Vendor 610 may use vendor portal 608 to communicate with enterprise 612 regarding particular projects.

B. Vendor Portfolio

Vendor portfolio 602 may include information about a particular vendor 610. The information may include general information for all vendors and specific information depending on the type of vendor 610. For example, vendor portfolio 602 may include information such as vendor name, address, and vendor type. Vendor portfolio 602 may have more specific information if vendor 610 is completing a high-risk task. For example, if vendor 610 is a network security software vendor, additional information may be required, such as type of technology, its certifications, personnel policies, and additional notes regarding its services.

C. Assessment Management

Assessment management system 604 may include vendor assessments. Vendor assessments may include questionnaires and document requests. Vendor assessments may be customizable by enterprise 612 depending on the type of vendor or type of task that the vendor is to carry out. Customer instance 600 allows enterprise 612 to customize details of the assessments, questionnaires, and document requests.

Vendor assessment questionnaires may come in various types, such as a standard information gathering questionnaire, general business questionnaire, cloud security questionnaire, data privacy questionnaire, or custom questionnaire. Other types of questionnaires are contemplated.

The standard information gathering questionnaire may include a standard set of questions for all vendors, including questions relating to risk assessment and treatment, security policies, organizational security, and asset management. The general business questionnaire may contain questions relating to general business practices, such as hiring policies, business record retention, or payment policies. The cloud security questionnaire may include questions relating to the vendor's cloud security procedures and policies. The data privacy questionnaire may include questions relating to data retention policies or the handling of data. The custom questionnaire may include some combination of the above questionnaires or questions specifically requested by enterprise 612. The questionnaires may be preset or may be designed by a managed network operator. Any type of question may be asked and the answers may come in various forms, such as a document attachment, Boolean answer, drop-down choices, date, number, percentage, sliding scale, numeric scale, string, template, reference, image scale, multiple selection, or ranking.

Enterprise 612 may assign various weights to the questionnaires or questions. These weights may correspond to internal rules enterprise 612 has created regarding risk assessment. The internal rules may be set by enterprise 612 based on what enterprise 612 identifies as important. The weights may relate to the priority or risk of a particular question. As an example, the weights may be a number with a range from 1-10. A weight of 1 may indicate a lower weight, while a weight of 10 may indicate a higher weight. For example, if vendor 610 is a network security vendor, questions related to cloud security or data privacy may be assigned a higher weight (7 or 8) than questions relating to general business practices (2 or 3). In another example, if vendor 610 is a computer hardware provider, general business practices may be assigned a higher weight than questions relating to cloud security.

Document requests may include a request from enterprise 612 to vendor 610 pertaining to a particular document. For example, enterprise 612 may request that vendor 610 attach documents relating to their business policies, such as document retention or handling of customer data.

After vendor 610 has responded to a questionnaire or document request, assessment management system 604 may assess the risk of vendor 610. The process for assessing risk may include dynamically calculating a risk score based on the predefined weights set by enterprise 612 for each of the questionnaire answers or documents attached in response to a document request form. Enterprise 612 may set the weights on a per-service, per-form, or per-question basis.

For example, enterprise 612 may create a questionnaire with three questions of different types for a particular vendor 610, including a multiple choice question, true/false question, and numerical response question. The multiple choice question may have answers A, B, and C, where answer A is a correct answer, B is a partially correct answer, and C is a wrong answer. Enterprise 612 may assign a weight of 5 to the multiple choice question, and a value of 1 for a correct answer, 0.5 for a partially correct answer, and 0 for a wrong answer. The true/false question may have answers "True" and "False". Enterprise 612 may assign a weight of 1 to the true/false question, and a value of 1 for true and 0 for false. The numerical response question may have an answer field that vendor 610 can fill out with a number ranging from 0-100. Enterprise 612 may assign a weight of 10 to the numerical response question, and value of 1 for responses ranging from 76 to 100, a value of 0.5 for response ranging from 51 to 75, and a value of 0 for responses ranging from 0 to 50.

After creating the questionnaire, Enterprise 612 may send the questionnaire to vendor 610. Vendor 610 may respond to the above questionnaire by selecting "C" for the multiple choice question, "True" for the true/false question, and may enter "63" for the numerical response question. Based on the weights set by enterprise 612, vendor 610 may receive a 0 with a weight of 5 for the multiple choice question, a 1 with a weight of 1 for the true/false question, and a 0.5 with a weight of 10 for the numerical response question. Assessment management system 604 may calculate a score by multiplying the value of the response with its corresponding weight and calculating the sum of all multiplied values. Assessment management system 604 may determine an overall score that ranges from 1-100 and is calculated by dividing the calculated score by the highest possible score and multiplying that quotient by 100. Based on the responses given in this example, assessment management system 604 may calculate a score of 6 for the responses given by vendor 610 (the sum of 0 with a weight of 5, 1 with a weight of 1, and 0.5 with a weight of 10). Assessment management 604 may also calculate an overall score of 37.5 (the calculated score of 6, divided by the highest possible score, multiplied by 100). Other possibilities exist.

D. Issues and Remediation

Issues and remediation system 606 may include tools enterprise 612 can use to remediate issues with vendor 610. Once vendor 610 responds to a questionnaire and/or document request and the assessment management system 604 assigns an overall score, enterprise 612 may determine that vendor 610 is not suited for the particular task related to the questionnaire and/or document request. Enterprise 612 may decide not to engage the vendor 610 further, or may want to request that the vendor 610 update its answers or change its policies. If enterprise 612 wishes to engage with the vendor 610 regarding updates to the vendor 610's policies, enterprise 612 may use issues and remediation system 606 of customer instance 600.

Issues and remediation system 606 may include an issues interface within the customer instance 600. The issues interface may be a graphical user interface that allows enterprise 612 to comment on answers to a specific questionnaire or a document in response to a specific document request. The issues interface may allow enterprise 612 to give a shorthand description of the issue, a full-length description of the issue, a status of the issue, a priority of the issue, and a recommendation to resolve the issue. Enterprise 612 may send the issue report to the vendor 610 via the third-party portal 608 described in the following section.

After a vendor 610 responds to an issue, assessment management system 604 may dynamically assess a new overall score for vendor 610. For example, assessment management system 604 may give an overall score of 37.5 to vendor 610 because of non-compliant policies. In response, vendor 610 may update some of their policies to compliant policies. In response to this event, assessment management system 604 may then dynamically assess a new overall score when vendor 610 submits the updated policy. In this example the new overall score may rise to a 90 depending on the predefined weights relating to that particular policy.

E. Vendor Portal

Vendor portal 608 may be a graphical user interface that serves as a point-of-contact for vendor 610 to communicate with enterprise 612. Vendor portal 608 may automatically send notifications to vendor 610 and enterprise 612 when documents are sent or uploaded. While enterprise 612 may have full access to the customer instance 600, vendor 610 may have a less transparent view, limited to vendor portal 608. Vendor 610 might only be able to see the assessments sent by enterprise 612, the issues reported by enterprise 612, and internal tasks for vendor 610. Vendor 610's view in vendor portal 608 may include a requests tab, issues tab, and tasks tab.

Vendor portal 608 may also include a user interface to allow vendor 610 to respond to the assessments and issues sent by enterprise 612. Vendor 610 may respond to questionnaires and documents requests in the request tab and respond to issues in the issues tab. Vendor 610 may also set internal tasks for authorized viewers in the tasks tab of vendor portal 608.

For example, enterprise 612 may send network security and data privacy questionnaires, accompanied by document requests for copies of their policies on network security and data privacy. These questionnaires may appear in the requests tab in vendor portal 608. Vendor 610 may then answer the questions in the questionnaire via the requests tab in the user interface associated with vendor portal 608. Vendor 610 may also attach the relevant documents via the graphical user interface. Enterprise 612, after receiving the answers and documents, may raise an issue, which may appear in the issues tab in vendor portal 608. Vendor 610 may then view and respond to the issues located in the issues tab in vendor portal 608. During or subsequent to responding via the requests tab, vendor 610 may assign internal tasks to its team members via the tasks tab.

VI. Example Graphical User Interface

FIGS. 7A-7D depict graphical user interfaces, in accordance with example embodiments. Each of these graphical user interfaces may be provided for display on one or more client devices. The information provided therein may be derived, at least in part, from data relating to customer instance 600. Nonetheless, these graphical user interfaces are merely for purpose of illustration. The applications described herein may provide graphical user interfaces that format information differently, include more or less information, include different types of information, and relate to one another in different ways.

One of the difficulties that enterprise 612 may encounter is that it is challenging to streamline and keep track of vendor risk assessment at all stages of vendor engagement. While enterprise 612 can track the forms and correspondence with vendor 610, it is sometimes difficult to determine who, at both the vendor 610 and enterprise 612 level, should be handling the tasks and issues presented during the risk assessment process.

As just one example, suppose enterprise 612 engages with multiple software vendors to complete a complex project. With embodiments herein, enterprise 612 may be able to efficiently assess the risk associated with each one. The embodiments described herein may provide enterprise 612 with a graphical user interface, which in turn may give enterprise 612 the ability to choose from preset risk assessment questionnaires or document requests. Enterprise 612 may also be able to create custom questionnaires or document requests. The embodiments herein may also allow enterprise 612 to set weights for each questionnaire or document request for a risk score calculation.

For instance, if enterprise 612 wanted to engage with a vendor 610 that is a network security vendor, enterprise 612 may be able to choose, via a graphical user interface, questionnaires or documents requests that pertained specifically to network security. Enterprise 612 may set weights to one or more of these questionnaires or documents requests to indicate the priority. Enterprise 612 may also set sub weights for particular questions or documents within the questionnaires or documents requests depending on the amount of risk associated with those particular questions or documents. After enterprise 612 is satisfied with the questionnaires and document requests chosen, enterprise 612 may send a request to vendor 610 to respond to the questionnaires and document requests. These questionnaires and document requests may also be referred to as fillable web-based forms. Vendor 610 may then receive the fillable web-based forms and, via another graphical user interface, at least partially fill out the forms and send them back to enterprise 612. Enterprise 612 may then receive, via the graphical user interface, the at least partially filled out forms and decide whether there are issues with the forms. These issues may include incomplete forms or an insufficient overall risk score. If enterprise 612 finds issues, the enterprise 612 may send the forms back to vendor 610 via the graphical user interface for remediation.

FIG. 7A depicts a graphical user interface 700. Graphical user interface 700 includes tab window 701 with table 710 to the right. Graphical user interface 700 may also include a search bar 708, page navigator 712, and a filter navigator 714. Both tab window 701 and table 710 provide a view into enterprise 612's list of vendors 610 for risk assessment. In subsequent figures, different variations of tab window 701 and table 710 are depicted. In some embodiments, the information displayed on tab window 701 and table 710 may be related, e.g., such that selection of an option on one of tab window 701 and table 710 impacts the information displayed in both. As an example, assume a managed network operator selects one of the tabs in tab window 701. This selection may change the information displayed in table 710 to information corresponding to one of the tabs in tab window 701. The tab window 701 portion of the graphical user interface 700 may include an assessments tab 702, issues tab 704, and administration tab 706.

A. Administration

FIG. 7B depicts a variation of graphical user interface 700 showing a selection of questionnaires created by enterprise 612. As with FIG. 7A, graphical user interface 700 of FIG. 7B may include assessments tab 702, issues tab 704, and administration tab 706. Assessments tab 702 and issues tab 704 are described in subsequent sections.

Administration tab 706 may contain information relating to assessment management system 604. Administration tab 706 may contain subtabs relating to management of the assessments tab 702 and issues tab 704, including assessment templates subtab 706a, questionnaire templates subtab 706b, document request templates subtab 706c, business service weights subtab 706d, choices subtab 706e, and score mapping subtab 706f.

Assessment templates subtab 706a may include predefined or custom templates enterprise 612 can use to assess the risk of vendor 610. These templates may include some combination of questionnaires and document requests tailored to different types of vendors. For example, enterprise 612 may want to engage a software vendor to develop a database for the enterprise 612's clients. In this example, enterprise 612 may determine data privacy of its clients is a high priority. Thus, enterprise 612 may focus the questionnaires and document requests on data privacy.

Questionnaire templates subtab 706b may include predefined or custom questionnaires enterprise 612 can use to ask risk-related questions to vendor 610. Based on the same example as above, enterprise 612 may choose predefined questions or create custom questions relating to data privacy in the predefined or custom questionnaires.

Document request templates subtab 706c may include predefined or custom document requests enterprise 612 can use to request risk-related documents from vendor 610. Based on the same example as above, enterprise 612 may choose predefined document requests or create custom document requests relating to data privacy in the predefined or custom document requests.

Business service weights subtab 706d may include a customizable interface that may provide enterprise 612 the ability to set different risk weights on particular business services. For instance, a user may determine that all services pertaining to network security should be weighted heavier than other services. While not depicted, a user may select the business service weights subtab and the graphical user interface 700 may open a window or a new graphical user interface page allowing the user to set the desired weights.

Choices subtab 706e may include general application settings, such as possible qualitative risk rating values (ex. Critical, High, Moderate, Low, Minor) for various vendors represented in graphical user interface 700.

Score mapping subtab 706f may include a "grade curve" that translates a numeric risk score (ex. 86 out of 100, 71 out of 100) into a qualitative risk rating (ex. Moderate, High). The grade curve may be set by enterprise 612 based on desired threshold levels.

In an example, a user associated with enterprise 612 may want to view all created questionnaire templates. The user may select questionnaire templates subtab 706b. This selection may cause the graphical user interface 700 to display a questionnaire interface.

The variation of graphical user interface 700 displayed in FIG. 7B may display the available questionnaires for a particular vendor. Table 710 in this variation of graphical user interface 700 may include a table header row 716 and table row details 716a-f. Table header row 716 may include descriptions for each column of the table, such as name of the questionnaire and description of the questionnaire. Table row details 716a-f may include the specific questionnaire names and descriptions. For example, table row detail 716a may include "Business" for the name of the questionnaire and "General business practices questionnaire" for the description of the questionnaire.

B. Assessments

Turning to FIG. 7A, assessments tab 702 may contain subtabs relating to the different assessment packages for vendor 610 and may relate to the assessment management system 604. Assessments tab 702 may include my assessments subtab 702a and all assessments subtab 702b. My assessments subtab 702a may include assessments that are operated or managed by users associated with enterprise 612 and logged into the graphical user interface 700. All assessments subtab 702b may include all of the assessments that are available, irrespective of whether the current user created or is responsible for managing those assessments.

An assessment may be made up of some combination of questionnaires and document requests. When a user wants to view a particular assessment, he or she may select my assessments subtab 702a or all assessments subtab 702b. While not depicted, the graphical user interface may present the user with a list of all assessments for a vendor 610. From this menu, the user may choose an assessment to send to vendor 610. After selecting the assessment and sending it to vendor 610, graphical user interface 700 may display vendor 610's progress in responding to the assessment.

FIG. 7C depicts a variation of graphical user interface 700 showing the selected assessment's progress. This variation of graphical user interface 700 contains a progress bar 718, assessment detail window 720, assessment component tabs 722, and navigation selector 724. Progress bar 718 may include the status of the assessment process, including stages for "draft," "submitted to vendor," "responses received," "generating observations," "finalizing with vendor," and "closed." The variation of graphical user interface 700 depicted in FIG. 7C shows the stage of "generating observations."

Assessment detail window 720 may include assessment information, such as assessment number 720a, vendor name 720b, assessment template 720c, assignee 720d, assessment name 720e, assessment description 720f, assessment state 720g, assessment risk rating 720h, assessment creation date 720i, and assessment updated date 720j.

Assessment number 720a may include the internal assessment number for enterprise 612. Tracking this number may assist with internal docketing and document retention. Vendor name 720b may include the vendor's full name or abbreviated name.

Assessment template 720c may reflect the user's assessment selection. In this representation, the assessment selection is "Security Assessment—High Risk—Cloud," indicating that the assessment pertains to cloud security that the managed network operator has determined is high risk.

Assessment name 720e may include the name the user gave the current assessment. In this representation, the assessment name 720e is "Security Assessment—2017."

Assessment description 720f may include a description of the assessment chosen by the user. The assessment description 720f in this representation is "assessment for information security policies and procedures."

Assessment state 720g may contain the current state of the assessment and may reflect the state on progress bar 718. Displaying the state of the assessment may be useful to quickly cue the user to the current state of the assessment if the managed network operator is tracking a large number of assessments.

Assessment risk rating 720h may be a configurable field where the user can assign a risk rating depending on the type of vendor and risk potential for the vendor's services. Risk ratings may include ratings such as low, medium, high, and critical. Risk ratings may correspond to the risk score assigned by assessment management system 604. For example, a risk score of 90/100 may have a risk rating of "low," while a risk score of 17/100 may have a risk rating of "critical." Other risk ratings may be possible.

Assessment creation date 720i and assessment updated date 720j may include timestamps for when the assessment was created and/or updated by the managed network operator. These dates may be useful to determine how much time has passed since creation of the assessment.

The variation of graphical user interface 700 in FIG. 7C may also contain assessment component tabs 722. Assessment component tabs 722 may include tabs for questionnaires, document requests, issues, and tasks. These tabs correspond to the elements of the assessment sent to the vendor. In this representation, graphical user interface 700 shows the questionnaires tab selected. The questionnaires tab may include details relating to the questionnaires located in the selected assessment, including a questionnaire detail row 722a and questionnaire details 722b, 722c, and 722d. Questionnaire detail row 722a may include information such as questionnaire name, description, score, and risk rating. The score and risk rating may be calculated in accordance with assessment management system 604. Questionnaire detail 722b may include information such as "Business" for questionnaire name, "General business practices" for questionnaire description, "17" for score, and "Critical" for risk rating. Questionnaire detail 722c may include information such as "Special Information Gathering (SIG) Lite" for questionnaire name, "Shared Assessment Standard Information Gathering" for questionnaire description, "76" for score, and "Low" for risk rating. Questionnaire detail 722c may include information such as "Privacy" for questionnaire name, "Data privacy questionnaire" for questionnaire description, "81" for score, and "Low" for risk rating.

C. Issues

Turning to FIG. 7A, issues tab 704 may contain information relating to issues and remediation system 606. Issues tab 704 may contain subtabs, including create new subtab 704a, my open issues subtab 704b, all open issues subtab 704c, and all issues subtab 704d. Create new subtab 704a may provide a user the ability to create a new issue for vendor 610 to resolve. This new issue may be customizable by enterprise 612 depending on the type of issue caused by vendor 610's response. My open issues subtab 704b may include open, unresolved issues that the current user has created in response to vendor 610's submitted forms. All open issues subtab 704c may include all open, unresolved issues, irrespective of whether the current user created the issue. All issues subtab 704d may include all issues, including all open issues and all resolved issues.

When a user wants to view a particular issue, he or she may select my open issues subtab 704b, all open issues subtab 704c, or all issues subtab 704d. Although not pictured, the graphical user interface 700, in response to this selection, may present the user with a list of issues for inspection. Once the user selects an issue, he or she can send the issue to the vendor, which may be displayed in another graphical user interface. Vendor 610 may also be notified of a new issue through an automatic notification generated by vendor portal 608.

FIG. 7D depicts a graphical user interface 726 in accordance with vendor portal 608. While graphical user interface 700 in FIGS. 7A-7C may represent the interface presented to enterprise 612, graphical user interface 726 in FIG. 7D may represent the interface presented to vendor 610.

Graphical user interface 726 may include a navigation bar 728, user ID 730, and vendor interface 732. Vendor interface 732 may include assessment components 734. Assessment components 734 may include tabs for requests, issues, and tasks.

The requests tab may contain all of the assessments sent to vendor 610 by enterprise 612. While not depicted, if a user selects the requests tab, graphical user interface 726 may display the assessments currently available to the vendor.

The issues tab may contain the issues sent to vendor 610 by enterprise 612 via graphical user interface 700 in FIGS. 7A-7C. The issues tab may contain issue details 734a and 734b. Issue details 734a may contain an issue number, short description, priority, state, and the user the issue is assigned to. Issue details 734b may contain predefined values set by a user via graphical user interface 700 in FIGS. 7A-7C. For example, if a user sends an issue to vendor 610 for resolution, the user may enter in issue details 734b such as "VAI1008" for issue number, "insufficient audit retention period" for the short description, "3—moderate" for priority, "unresolved" for state, and "John Doe" for the user to which the issue is assigned. From this tab, vendor 610 may be able to select the issue to resolve. Upon this selection, while not depicted, the graphical user interface may display a window facilitating the resolution of the issue in the issue tab. The process of resolving the issue may be in accordance with issues and remediation system 606.

The graphical user interfaces of FIGS. 7A-7D are examples, and different graphical user interfaces with different arrangements of information could be used and are contemplated herein.

VII. Example Operations

Figure 8:
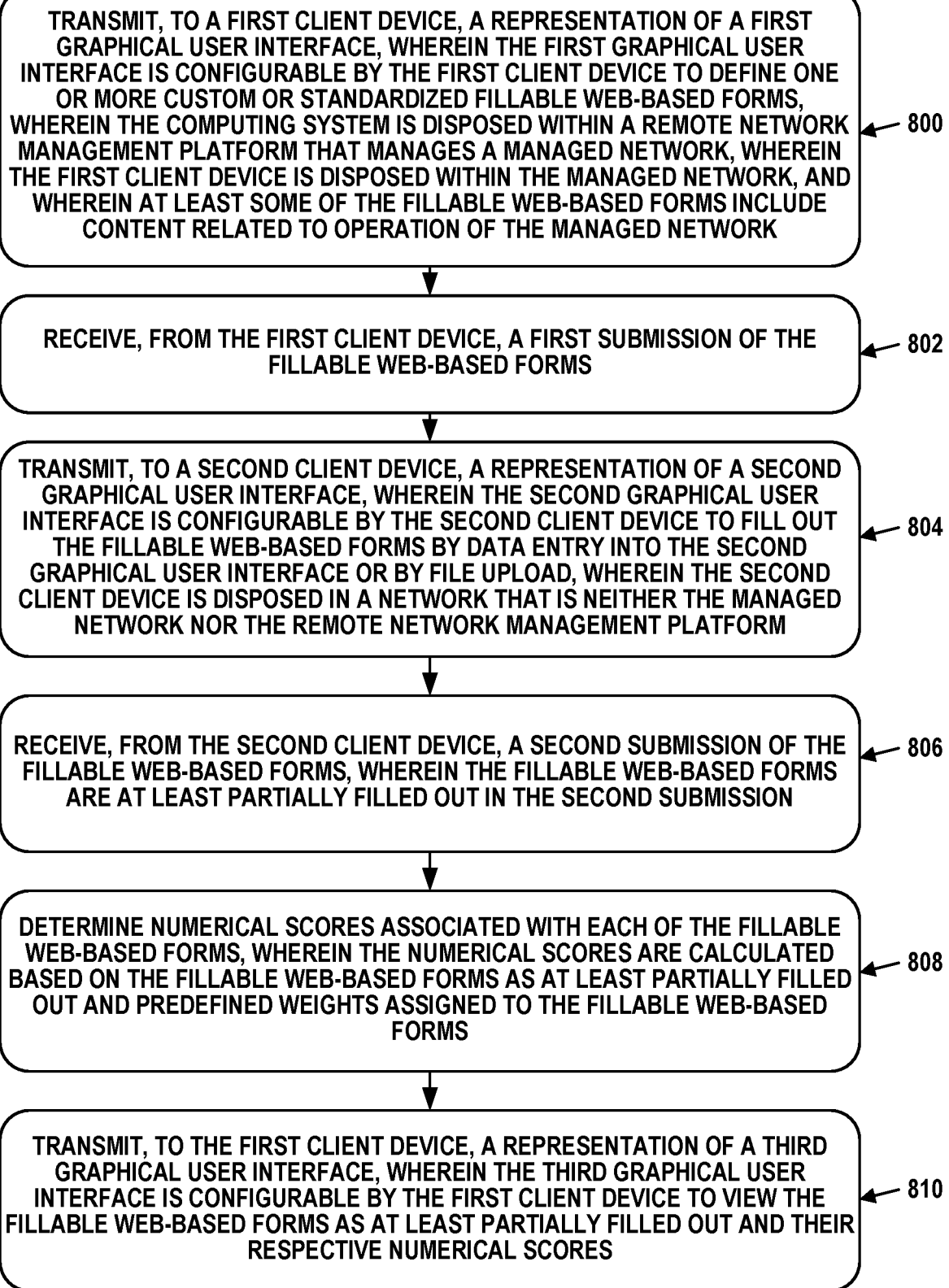
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may include transmitting, to a first client device, a representation of a first graphical user interface. The first graphical user interface may be configurable by the first client device to define one or more custom or standardized fillable web-based forms. The computing system may be disposed within a remote network management platform that manages a managed network and the first client device may be disposed within the managed network. In some embodiments, the computing system and first client device may be disposed within the managed network. At least some of the fillable web-based forms may include content related to operation of the managed network.

Block 802 may include receiving, from the first client device, a first submission of the fillable web-based forms.

Block 804 may include transmitting, to a second client device, a representation of a second graphical user interface. The second graphical user interface may be configurable by the second client device to fill out the fillable web-based forms by data entry into the second graphical user interface or by file upload. The second client device may be disposed in a network that is neither the managed network nor the remote network management platform.

Block 806 may include receiving, from the second client device, a second submission of the fillable web-based forms. The fillable web-based forms may be at least partially filled out in the second submission.

Block 808 may include determining numerical scores associated with each of the fillable web-based forms. The numerical scores may be calculated based on the fillable web-based forms as at least partially filled out and predefined weights assigned to the fillable web-based forms.

Block 810 may include transmitting, to the first client device, a representation of a third graphical user interface. The third graphical user interface may be configurable by the first client device to view the fillable web-based forms as at least partially filled out and their respective numerical scores.

Some embodiments may further involve receiving, from the second client device, an updated submission of the fillable web-based forms. The updated submission of the fillable web-based forms may contain at least some different information from the second submission of the fillable web-based forms. These embodiments may also involve determining updated numerical scores associated with each of the fillable web-based forms. These embodiments may further involve transmitting, to the first client device, the representation of the third graphical user interface. The third graphical user interface may be configurable by the first client device to view the fillable web-based forms as updated and their respective updated numerical scores.

Other embodiments may further involve receiving, from the first client device, an indication of deficiencies in the second submission of the fillable web-based forms. The indication of deficiencies may include a description of a deficiency, a priority of deficiency, and a state of resolution. These embodiments may further involve transmitting, to the second client device, a representation of a fourth graphical user interface. The fourth graphical user interface may be configurable by the second client device to respond to the indication of deficiencies. Some embodiments may further involve receiving, from the second client device, an updated submission of the fillable web-based forms. These embodiments may also involve determining that the fillable web-based forms as updated resolve the deficiencies. Further, these embodiments may involve determining updated numerical scores associated with each of the fillable web-based forms. These embodiments may also involve transmitting, to the first client device, a representation of the third graphical user interface. The third graphical user interface may include an indication that the deficiencies are resolved, the updated submission of the fillable web-based forms, and their updated numerical scores.

In some embodiments, the reception of the representation of the first graphical user interface may cause the first client device to render the first graphical user interface on a display unit of the first client device. Also, the reception of the representation of the second graphical user interface may cause the second client device to render the second graphical user interface on a display unit of the second client device. Further, the reception of the representation of the third graphical user interface may cause the first client device to render the third graphical user interface on the display unit of the first client device.

In some embodiments, the fillable web-based forms may include questionnaires. In other embodiments, the fillable web-based forms may include document requests.

In some embodiments, the predefined weights may be assigned by the first client device via the representation of the first graphical user interface. The predefined weights may include different weights for each form of the fillable web-based forms. The predefined weights may include sub weights corresponding to subsections of each of the fillable web-based forms.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A non-transitory machine-readable medium comprising instructions that, when executed by a processor, cause the processor to perform operations comprising:
   receiving, via a vendor portal of a network management platform, a submission from a vendor, the submission comprising one or more answers to one or more questions of a web-based questionnaire;
   identifying one or more deficiencies in the one or more answers;
   determining a score associated with the submission, wherein the score is determined based at least in part on the one or more answers to the one or more questions, wherein the one or more deficiencies negatively affect the determined score;
   providing, via the network management platform, the determined score associated with the submission to an enterprise client device of the network management platform; and
   providing to the vendor, via the vendor portal of the network management platform, an indication of the one or more deficiencies corresponding to the submission, wherein the indication of the one or more deficiencies comprises a respective priority level, for each of the one or more deficiencies, associated with how much each of the one or more deficiencies negatively affect the determined score.

2. The non-transitory medium of claim 1, wherein the operations comprise receiving, via the network management platform, weightings corresponding to the one or more questions of the web-based questionnaire, wherein the score is determined based at least in part on the weightings.

3. The non-transitory medium of claim 2, wherein the respective priority level of each of the one or more deficiencies is determined based at least in part on the weightings.

4. The non-transitory medium of claim 2, wherein different answers to a single question of the one or more questions are weighted differently based at least in part on the weightings, and wherein the weightings comprise sub-weights corresponding to subsections of the web-based questionnaire.

5. The non-transitory medium of claim 1, wherein the operations comprise:
   receiving, via the network management platform, an updated submission in response to the provided indication of the one or more deficiencies, wherein the updated submission comprises at least one answer that is different from the one or more answers; and
   updating the score based at least in part on the updated submission.

6. The non-transitory medium of claim 1, wherein the web-based questionnaire comprises a document request, a multiple-choice question, a string input question, or a combination thereof.

7. The non-transitory medium of claim 1, wherein the operations comprise providing a graphical user interface configured to facilitate:
   customizing the web-based questionnaire based at least in part on one or more questionnaire templates; and
   displaying an assessment of the submission.

8. The non-transitory medium of claim 1, wherein the operations comprise providing a graphical user interface configured to facilitate:
   filling out the web-based questionnaire;
   displaying the indication of the one or more deficiencies; and
   remediation of the one or more deficiencies.

9. The non-transitory medium of claim 1, wherein the one or more deficiencies comprise incomplete answers, unsatisfactory answers, or a combination thereof.

10. A system comprising:
a processor; and
non-transitory memory comprising instructions that, when executed by the processor, cause the processor to perform operations comprising:
receiving, via a vendor portal and from a client device of a vendor, a submission comprising one or more answers to one or more questions of a web-based questionnaire;
identifying one or more deficiencies in the one or more answers;
determining a score associated with the submission, wherein the score is determined based at least in part on the one or more answers to the one or more questions, wherein the one or more deficiencies negatively affect the determined score;
providing the determined score associated with the submission to an enterprise client device; and
providing, to the client device of the vendor, an indication of the one or more deficiencies corresponding to the submission, wherein the indication of the one or more deficiencies comprises a respective priority level, for each of the one or more deficiencies, associated with how much each of the one or more deficiencies negatively affect the determined score.

11. The system of claim 10, wherein the web-based questionnaire corresponds to one or more vendor policies.

12. The system of claim 11, wherein the score is determined based at least in part on a comparison of each of the one or more vendor policies a corresponding enterprise policy, wherein a deficiency of the one or more deficiencies corresponds to a policy of the one or more vendor policies that is insufficient compared to the corresponding enterprise policy.

13. The system of claim 10, wherein the operations comprise receiving, via the enterprise client device, weightings corresponding to the one or more questions of the web-based questionnaire, wherein the score is determined based at least in part on the weightings.

14. The system of claim 13, wherein the respective priority level of each of the one or more deficiencies is determined based at least in part on the weightings.

15. The system of claim 10, wherein the indication of the one or more deficiencies comprises a description of a deficiency of the one or more deficiencies, the respective priority level of the deficiency, and a state of resolution of the deficiency.

16. A method comprising:
receiving, via a vendor portal of a network management platform, a submission from a vendor, the submission comprising one or more answers to one or more questions of a web-based questionnaire;
identifying one or more deficiencies in the one or more answers;
determining a score associated with the submission based at least in part on one or more weights assigned to the one or more questions, wherein the score is determined based at least in part on the one or more answers to the one or more questions, wherein the one or more deficiencies negatively affect the determined score;
providing, via the network management platform, the determined score associated with the submission to an enterprise client device of the network management platform; and
providing to the vendor, via the vendor portal, an indication of the one or more deficiencies corresponding to the submission, wherein the indication of the one or more deficiencies comprises a respective priority level, for each of the one or more deficiencies, associated with how much each of the one or more deficiencies negatively affect the determined score.

17. The method of claim 16, comprising providing the web-based questionnaire to a candidate vendor, wherein the one or more answers correspond to policies of the candidate vendor.

18. The method of claim 16, comprising receiving, from the enterprise client device of the network management platform, the one or more weights, wherein a first answer to a first question of the one or more questions affects the score more than a second answer to a second question of the one or more questions according to the one or more weights.

19. The method of claim 16, comprising receiving, via the network management platform, an updated submission in response to the indication of the one or more deficiencies, wherein the updated submission comprises at least one answer that is different from the one or more answers.

20. The method of claim 19, comprising:
determining that the updated submission resolves at least one deficiency of the one or more deficiencies;
determining an updated score associated with the updated submission; and
providing, a second indication that the deficiency is resolved.

* * * * *